Figure 1:
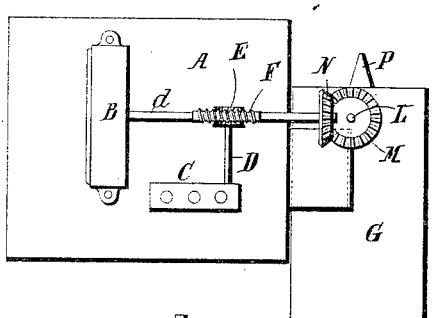

(No Model.) 2 Sheets—Sheet 1.

J. THORNE & E. B. BURR.
SPEED INDICATOR AND SHIP'S LOG.

No. 439,442. Patented Oct. 28, 1890.

(No Model.) 2 Sheets—Sheet 2.
J. THORNE & E. B. BURR.
SPEED INDICATOR AND SHIP'S LOG.

No. 439,442. Patented Oct. 28, 1890.

Witnesses
J. A. Rutherford
O. W. Real

Inventors:
James Thorne
Ebenezer B. Burr
By James L. Norris
Attorney

UNITED STATES PATENT OFFICE.

JAMES THORNE AND EBENEZER BANTON BURR, OF LONDON, ENGLAND.

SPEED-INDICATOR AND SHIP'S LOG.

SPECIFICATION forming part of Letters Patent No. 439,442, dated October 28, 1890.

Application filed June 25, 1890. Serial No. 356,630. (No model.) Patented in England March 5, 1887, No. 3,419.

*To all whom it may concern:*

Be it known that we, JAMES THORNE, merchant, and EBENEZER BANTON BURR, engineer, subjects of the Queen of Great Britain, and residents of London, England, have invented certain new and useful Improvements Relating to Apparatus for Indicating and Registering the Speed of Ships and of Currents, (for which we have obtained a patent in Great Britain, No. 3,419, dated March 5, 1887,) of which the following is a specification, reference being had to the accompanying drawings.

The main object of our invention is to provide for indicating the "present speed" of a ship or vessel—that is to say, the speed thereof at any moment—and for simultaneously registering the total distance run by the said ship or vessel during the time the apparatus is in use.

One part of our present invention consists in the combination of a speed-indicator for indicating speed by the deflection of a needle or pointer by means of electric currents induced in a copper sheath or drum when rotated in a magnetic field, a ship's log of any well-known or suitable construction, and means for driving the said speed-indicator and ship's log. For this purpose we sometimes employ a shaft provided with gearing, as hereinafter described, whereby said speed-indicator and ship's log are rotated at their proper relative speed. Moreover, the said shaft is connected by means of a vertical or other shaft and miter or bevel gearing or other means to a rotator of the kind usually employed in connection with ships' logs. If it is not desired to ascertain the total distance run by the ship or vessel during the time the apparatus is in use, the ship's log can be dispensed with and the indicator apparatus used alone.

We find it advantageous to employ multiplying-gear between the shaft driven by the rotator and the spindle upon which the copper sheath or drum of the speed-indicator is fixed.

Our said invention is conveniently and advantageously carried into practice in the following manner—that is to say. upon a shaft supported horizontally in bearings we form or fix a worm or endless screw, which is geared with a worm-wheel and fixed upon the driving-spindle of a ship's log of any suitable description. At one extremity of the said shaft we provide a toothed wheel having a suitable number of teeth and of the proper diameter to produce the required number of revolutions of the aforesaid copper drum, with the spindle of which the above-described toothed wheel is geared by means of a pinion fixed upon the said spindle. At the other extremity of the said shaft is a miter-wheel or bevel-wheel, fixed upon the upper end of a vertical shaft. This shaft has fixed thereon at its lower end a miter-wheel or bevel-wheel, which is geared with another miter-wheel or bevel-wheel fixed upon a rotator similar to those usually employed in connection with ship's logs. The said rotator is suitably supported in a short piece of tube open at either extremity, or in a frame supported by means of stays or of a bracket fixed or attached to the side of the ship or vessel. If necessary, the vertical shaft can also be provided with suitable bearings in brackets attached to the ship's side at any suitable points in the length of the said shaft. Moreover, we can combine with the said indicator in any other convenient manner any ordinary or well-known apparatus which can be put into operation by the rotator that drives the indicator, and which will register the total distance run by the ship or vessel while the apparatus is in use. For instance, the counting or registering mechanism of some of the ships' logs at present in use can be advantageously employed in combination with the said speed-indicator for the purpose of our invention. In the speed-indicator which we employ the needle or pointer is deflected by means of induced electric currents produced by the rotation in a magnetic field of a cylindrical sheath or drum of copper or similar conducting material. We prefer to inclose in the said sheath or drum an armature of soft iron, which is capable of rotation independently of the said sheath or drum, and which either carries the needle or pointer or is geared therewith in any convenient manner.

Figure 2:
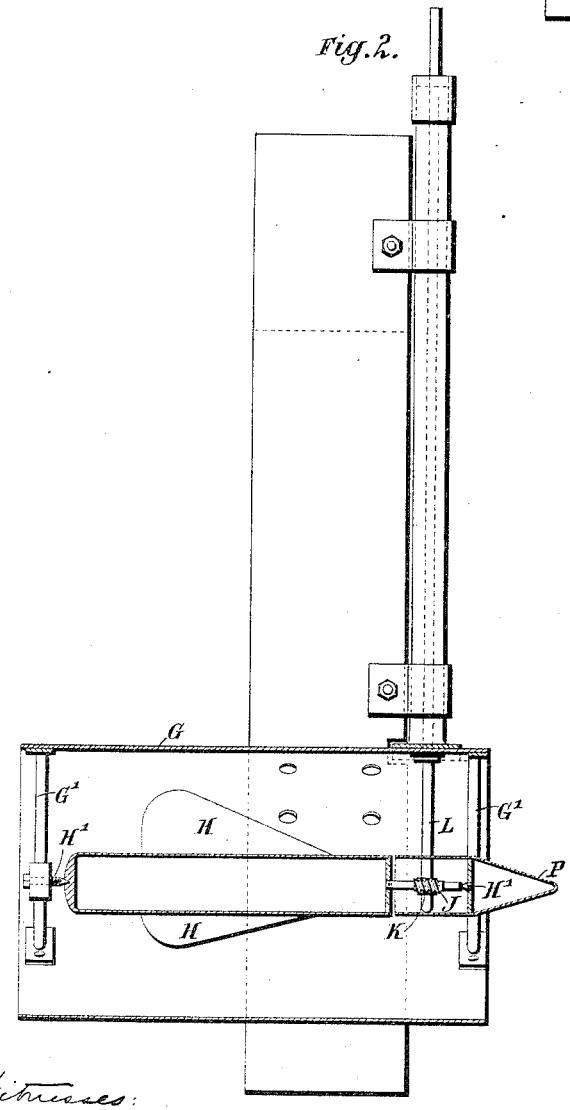
Figure 4:
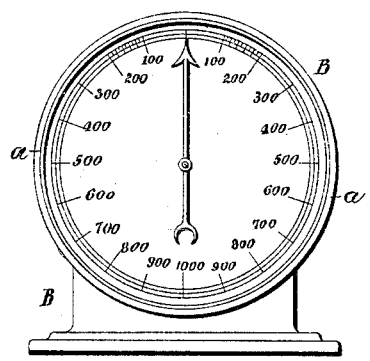
Figure 5:
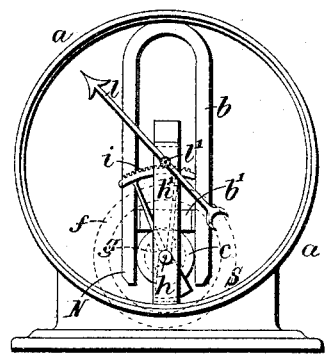
Figure 6:
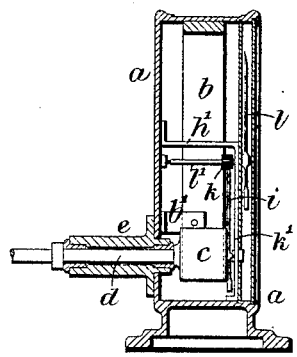
Figure 7:
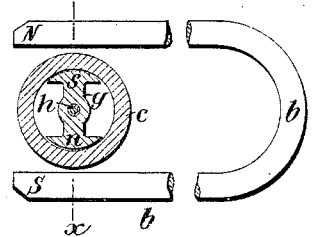
Figure 8:
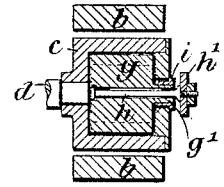

In the accompanying drawings, Figure 1 is a diagram illustrating apparatus constructed according to our said invention. Fig. 2 is a vertical longitudinal section, and Fig. 3 an end elevation, of a rotator, hereinafter described. Fig. 4 is a front elevation of the speed-indicator. Fig. 5 is a similar view, the dial being removed to show the internal mechanism. Fig. 6 is a vertical transverse central section of the said indicator. Fig. 7 is a sectional elevation showing the magnet and the copper sheath with the armature therein. Fig. 8 is a section on the line $x\ x$, Fig. 7.

Referring to Fig. 1, A is a board or platform upon which is mounted a speed-indicator B, the construction of which is hereinafter described.

C is a ship's log, connected by means of the spindle D, worm-wheel E, and worm F with the shaft $d$ of the speed-indicator B.

Figure 3:
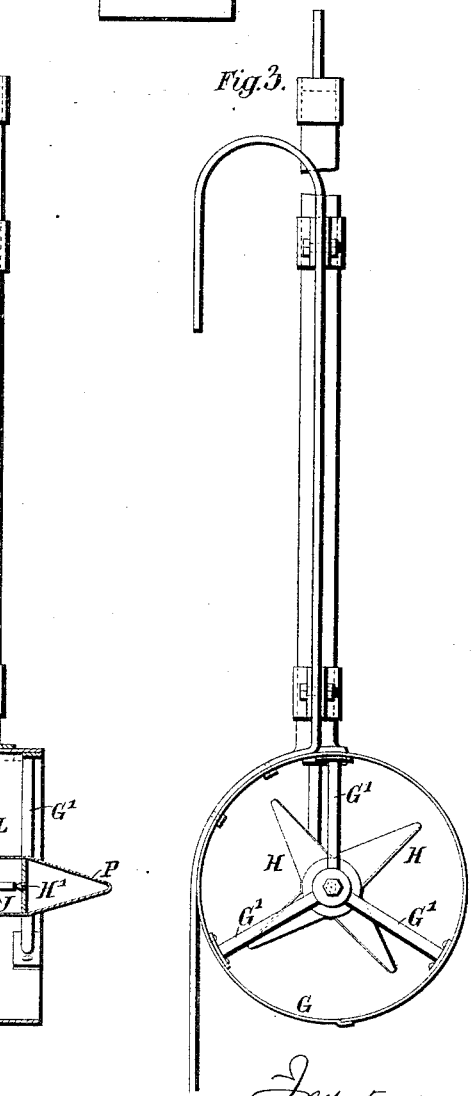

G is a device constructed and arranged, as shown in Figs. 2 and 3, for actuating the said indicator and log. This device comprises a screw-rotator H, supported by pointed screws or studs H′, fixed in the arms or cross-bars G′.

A worm J is fixed on one end of the rotator H and engages with a worm-wheel K, fixed upon the vertical shaft L. The upper end of this shaft has fixed thereon a miter or bevel wheel M, Fig. 1, geared with another bevel-wheel N, fixed upon the end of the horizontal shaft $d$ of the indicator B. By these means the motion of the rotator H will be communicated through the worm J, worm-wheel K, shaft L, bevel-gearing M N, and horizontal shaft $d$ to the indicator B, and also, if required, to the log C through the worm F, worm-wheel E, and shaft D. A conical piece P is attached to the forward arm or cross-bar G′ to facilitate the displacement of the water as the device G is moved through the same.

Referring to Figs. 4 to 8, $a$ is a case or box in which the mechanism is inclosed.

$b$ is a horseshoe-magnet, which is firmly secured at $b'$ to the said case.

$c$ is the copper sheath or drum, which is mounted upon a shaft or spindle $d$, carried in a bearing $e$, formed on or attached to the case $a$, and which is arranged to be rotated between the poles of the magnet $b$.

$g$ is the armature, which is fitted to rotate upon a stud or shaft $h$, fixed in a bracket $h'$, attached to the case $a$. The said stud or shaft is insulated from the armature, and is in axial alignment with the shaft $d$. The said armature and sheath are thus arranged to turn upon or about a common axis; but the armature is independent of the said sheath, and is only moved by the action upon the said armature of the induced currents generated by the rotation of the said sheath in the magnetic field.

In the apparatus shown in the drawings a toothed segment $i$ is fixed upon the boss $g'$ of the armature and gears with a pinion $k$, fixed upon the arbor $l'$ of the needle or pointer $l$. If desired, the needle or pointer may be fixed upon the boss $g'$ of the armature $g$; but in such case the range of indications will be more restricted than when a segment and pinion are used. Moreover, other gearing may, if desired, be substituted for the said segment and pinion for imparting motion from the armature to the needle or pointer. The armature $g$ under the influence of the magnet $b$ becomes itself a magnet. The poles of these two magnets are marked N S $n$ $s$. When the sheath or drum $c$ is rotated between these poles electric currents are induced in the said sheath or drum, and the action of these currents upon the armature tends to rotate the latter in the same direction as the said sheath or drum. The said armature, however, by reason of magnetic attraction tends to resume its normal position. The result is that the armature is turned through an angle proportionate to the speed of rotation of the said sheath or drum, and this result is not affected by any loss or diminution of strength in the magnet, because such loss or diminution of strength is equal in both poles. Consequently the currents induced by the rotation of the sheath or drum will be proportionately less, and the deflection of the armature, and therefore of the needle or pointer, will still be proportionate to the speed of rotation of the sheath or drum. The dial of the instrument is so graduated that the pointer will correctly indicate thereon the speed of the vessel on which the instrument is used. The said dial is either graduated to indicate revolutions per minute or it is graduated to indicate miles or knots per hour to adapt it for use on board ship.

According to a modification of our invention we dispense with the magnet $b$ and use a permanent magnet instead of the armature $g$; but in this case it is necessary to employ a spring connected with the magnet, which spring will tend to cause the said magnet to resume its normal position.

It is obvious that the construction of this instrument may be somewhat modified, if desired, without departing from the nature of our said invention.

What we claim is—

1. A speed-indicator wherein the needle is operated by means of an induced current of electricity acting upon an armature inclosed in a metallic drum rotating in a magnetic field, substantially as and for the purposes set forth.

2. The combination, with a speed-indicator wherein the needle or pointer is operated by means of induction-currents produced by the rotation in a magnetic field, of a sheath or drum of copper or similar conducting material, and a rotator connected with the said indicator, substantially as and for the purposes set forth.

In testimony whereof we have hereunto signed our names in the presence of two subscribing witnesses.

JAMES THORNE.
EBENEZER BANTON BURR.

Witnesses:
ROBT. JNO. DANTER,
 30 *Bishop's Road, North Brixter, S. W.*
W. J. HAMMOND,
 *York Road, Upton Park, E.*